US012653337B2

(12) United States Patent
Wu et al.

(10) Patent No.: US 12,653,337 B2
(45) Date of Patent: Jun. 16, 2026

(54) JUICER AND BLENDER-COMPATIBLE POWER DEVICE

(71) Applicants: Zhejiang Linix Motor Co., Ltd., Dongyang (CN); Hurom Co., Ltd., Gimhae-si (KR)

(72) Inventors: Xiaofeng Wu, Dongyang (CN); Haiqiang Zhao, Dongyang (CN); Jianhua Lan, Dongyang (CN); Hyanggon Kim, Ghimhae-si (KR); Dae Hwa Kim, Yangsan-si (KR)

(73) Assignees: Zhejiang Linix Motor Co., Ltd., Dongyang (CN); Hurom Co., Ltd., Gimhae-si (KR)

( * ) Notice: Subject to any disclaimer, the term of this patent is extended or adjusted under 35 U.S.C. 154(b) by 1074 days.

(21) Appl. No.: 17/775,297

(22) PCT Filed: Nov. 2, 2020

(86) PCT No.: PCT/CN2020/125840
§ 371 (c)(1),
(2) Date: Oct. 28, 2022

(87) PCT Pub. No.: WO2021/088764
PCT Pub. Date: May 14, 2021

(65) Prior Publication Data
US 2023/0055385 A1 Feb. 23, 2023

(30) Foreign Application Priority Data
Nov. 8, 2019 (CN) .......................... 201911084806.2

(51) Int. Cl.
| *A47J 19/02* | (2006.01) |
| *A47J 19/06* | (2006.01) |
| *A47J 43/07* | (2006.01) |

(52) U.S. Cl.
CPC ............. *A47J 19/025* (2013.01); *A47J 19/06* (2013.01); *A47J 43/07* (2013.01)

(58) Field of Classification Search
CPC ...... A47J 43/04; A47J 43/0722; A47J 43/085; F16H 37/0833; B02C 13/205; B02C 13/24; B02C 13/30
(Continued)

(56) References Cited

U.S. PATENT DOCUMENTS 4,019,722 A * 4/1977 Shohet .................... B01F 27/84
366/261

FOREIGN PATENT DOCUMENTS

| CN | 105231908 | 1/2016 |
| CN | 108968719 | 12/2018 |
(Continued)

OTHER PUBLICATIONS

Wang, WO 2019205676 A1 (Year: 2019).*
(Continued)

*Primary Examiner* — Vy T Nguyen

(57) ABSTRACT

A juicer and blender-compatible power device, comprising: a driving part used for generating power; a first driving shaft and a second driving shaft, wherein the first driving shaft rotates by means of the driving part, the second driving shaft is a hollow shaft, the first driving shaft penetrates the inside of the second driving shaft, and the second driving shaft rotates at a speed different from that of the first driving shaft; a supporting part, wherein end parts of the the first driving shaft and the second driving shaft protrude from a hole of the supporting part, and the second driving shaft may be rotatably supported on the supporting part; a first bearing arranged between the first driving shaft and the second driving shaft; and a second bearing arranged between the second driving shaft and the supporting part. The first
(Continued)

bearing and the second bearing are arranged to overlap in the horizontal direction. In the juicer and blender-compatible power device, the rotating shafts that rotate at high and low speeds may be formed into a dual-shaft form, so that same may be compatibly used for a juicer and a blender, and the power device may be made more compact.

10 Claims, 7 Drawing Sheets

(58) Field of Classification Search
USPC ....... 366/295, 296, 294, 149, 195, 196, 203, 366/204, 304, 319, 323, 331, 66; 310/83; 475/253; 99/455; 241/187, 188.2, 241/199.12, 246, 260.1, 98
See application file for complete search history.

(56) References Cited

FOREIGN PATENT DOCUMENTS

| CN | 110384386 | 10/2019 |
| CN | 110811279 | 2/2020 |
| CN | 110833305 | 2/2020 |
| CN | 211212545 | 8/2020 |

OTHER PUBLICATIONS

Notification of Office Action and Search Report Dated Apr. 18, 2024 From the State Intellectual Property Office of the People's Republic of China Re. Application No. 201911084806.2 and Its Translation Into English. (19 Pages).
International Search Report and the Written Opinion Dated Feb. 1, 2021 From the International Searching Authority Re. Application No. PCT/CN2020/125840 and Its Translation of Search Report Into English. (12 Pages).

* cited by examiner

110

JUICER AND BLENDER-COMPATIBLE POWER DEVICE

RELATED APPLICATIONS

This application is a National Phase of PCT Patent Application No. PCT/CN2020/125840 having International filing date of Nov. 2, 2020, which claims the benefit of priority of China Patent Application No. 201911084806.2 filed on Nov. 8, 2019. The contents of the above applications are all incorporated by reference as if fully set forth herein in their entirety.

FIELD AND BACKGROUND OF THE INVENTION

The present disclosure relates to a driving apparatus for combined use of juicer and mixer, and more particularly, to a driving apparatus for combined use of juicer and mixer, that enables joint use of a juicer that crushes and presses ingredients such as vegetables and fruits by use of a screw rotating at a low speed to generate squeezed juice and a mixer that crushes or mixes ingredients by use of a mixer blade rotating at a high speed.

In general, a mixer is a device for grinding and mixing food ingredients such as vegetables, fruits and grains by means of a mixer blade rotating at a high speed, and as disclosed in Korean Patent Registration No. 10-793852, a juicer is a home appliance device for making soymilk using the principle used in millstones where beans are crushed and pressed by grinding and pressing the ingredients between a net drum and a screw rotating at a low speed and also for making juice by grating and pressing fruits having high viscosity such as tomatoes, kiwis, strawberries.

Both devices have similar operations of rotating the mixer blade or screw using a motor, and thus it is possible to combine the two functions and make one device for combined use of mixer and juicer. That is, it is possible to mount onto a single main body having a motor-rotatable protruding driving shaft either with a housing where a mixer blade is mounted or with a housing where a screw is mounted, for combined use of mixer and juicer. However, there is a problem that the mixer blade has to be rotated at a high speed whereas the screw has to be rotated at a low speed.

SUMMARY OF THE INVENTION

Therefore, a purpose of the present disclosure is to provide a driving apparatus for combined use of juicer and mixer, where a rotation shaft for rotating at a low speed and a high speed is made in a dual shaft form to enable combined use of juicer and mixer and where the power device is made more compact.

The problems intended to be solved by the present disclosure are not limited to the problems mentioned above, and other problems not mentioned will be clearly understandable by those skilled in the art from the following description.

The purpose mentioned above may be achieved by a driving apparatus for combined use of juicer and mixer, the apparatus including a driving part for generating power; a first driving shaft that is rotated by the driving part, and a second driving shaft having a hollow shaft through which the first driving shaft penetrates and rotating at a different speed from the first driving shaft; a support part that has a hole through which an end part of the first driving shaft and the second driving shaft protrude, and that rotatably supports the second driving shaft; a first bearing disposed between the first driving shaft and the second driving shaft; and a second bearing disposed between the second driving shaft and the support part, wherein the first bearing and the second bearing are disposed to overlap each other in a horizontal direction.

Here, at a center of a bottom surface of the second driving shaft, there may be formed a first bearing insertion groove into which the first bearing is inserted.

Here, at a center of a bottom surface of the support part, there may be formed a second bearing insertion groove into which the second bearing is inserted.

Here, the driving apparatus for combined use of juicer and mixer may further include a third bearing that is disposed between the second driving shaft and the support part at an upper position than the second bearing.

Here, the second driving shaft may include a lower flange part having an outer surface where the second bearing is disposed; and an intermediate shaft part having a smaller diameter than the lower flange part above the lower flange part, and an outer surface where the third bearing is disposed.

Here, the third bearing may be disposed on an upper surface of the lower flange part.

Here, the support part may have a third bearing insertion groove with a smaller diameter above the second bearing insertion groove so that the third bearing can be inserted.

Here, the driving part may include a motor for rotating the first driving shaft at a high speed; a clutch bearing that is disposed on the first driving shaft and that transmits torque only when the first driving shaft rotates in one direction; and a deceleration part that is formed between the second driving shaft and the clutch bearing and that decelerates the rotation of the motor to rotate the second driving shaft at a low speed.

Here, the driving part may further include a power transmission part that is coupled to surround an outer ring of the clutch bearing and rotates when the first driving shaft rotates in one direction.

Here, the deceleration part may include a sun gear that is disposed on the first driving shaft and that has an end part coupled to a hollow part formed in the power transmission part, to rotate; a plurality of planetary gears that are gear-coupled to the sun gear, to rotate; and a ring gear that is formed to surround an outer side of the plurality of planetary gears and that is gear-coupled to the plurality of planetary gears.

Here, the sun gear and the plurality of planetary gears may be formed in multi-tiers, and between each tier, a carrier may be formed that supports the plurality of planetary gears and rotates.

According to the driving apparatus for combined use of juicer and mixer of the present disclosure described above, there is an advantage of combined use of juicer and mixer by forming a high speed driving shaft and a low speed driving shaft around a concentric circle in a dual shaft shape, and by enabling replacement between a housing for use as a mixer and a housing for use as a juicer.

Further, when rotating the high speed driving shaft for use as a mixer, due to the clutch bearing, power is not transmitted to the low speed rotation shaft, and thus there is an advantage of resolving the problems of power loss, noise, wear and failure that might have been caused by unnecessary operations of the deceleration part.

In addition, there is also an advantage that the bearing disposed between the high speed driving shaft and the low speed driving shaft and the bearing disposed between the housing supporting the low speed driving shaft and the low speed driving shaft are disposed to overlap each other in a horizontal direction, thereby enabling more compact manufacturing of the driving apparatus.

REFERENCE NUMERALS

Figure 1:
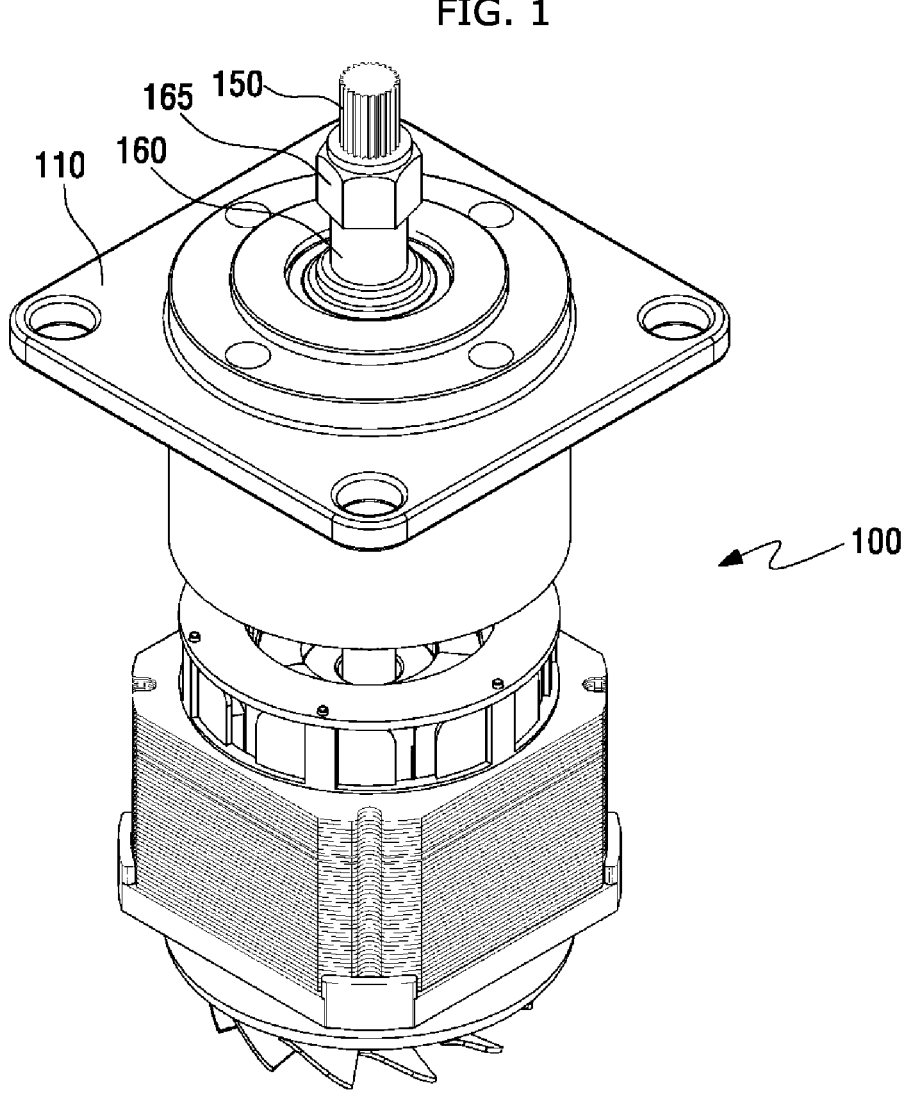
FIG. 1 is a perspective view of a driving apparatus for combined use of juicer and mixer according to an embodiment of the present disclosure.

100: DRIVING APPARATUS FOR COMBINED USE OF JUICER AND MIXER
110: SUPPORT PART
112: SECOND BEARING INSERTION GROOVE
114: THIRD BEARING INSERTION GROOVE
119: SCREW HOLE
120: MOTOR
125: CLUTCH BEARING
127: POWER TRANSMISSION PART
128: HOLLOW PART
131: FIRST SUN GEAR
133: FIRST PLANETARY GEAR
136: SECOND SUN GEAR
138: SECOND PLANETARY GEAR
141: THIRD SUN GEAR
143: THIRD PLANETARY GEAR
145: RING GEAR
146: SCREW HOLE
147: CARRIER
149: SCREW
150: FIRST DRIVING SHAFT
160: SECOND DRIVING SHAFT
161: LOWER FLANGE PART
162: FIRST BEARING INSERTION GROOVE
163: INTERMEDIATE SHAFT PART
165: PRISMATIC PROTRUSION
169: PENETRATION HOLE
171: FIRST BEARING
172: SECOND BEARING
173: THIRD BEARING

DESCRIPTION OF SPECIFIC EMBODIMENTS OF THE INVENTION

Specific details of the embodiments are included in the detailed description and drawings.

Advantages and features of the present disclosure, and methods for achieving them will become apparent with reference to the embodiments described below in detail in conjunction with the accompanying drawings. However, the present disclosure is not limited to the embodiments disclosed hereinbelow, but may be implemented in various different forms, and the present embodiments are provided so that the disclosure of the present disclosure is complete and to completely inform those with ordinary skill in the art to which the present disclosure pertains about the scope of the present disclosure, and the present disclosure is merely defined by the scope of the claims. Throughout the entirety of the specification, like reference numerals indicate like components.

Further, each configuration shown in the drawings is arbitrarily shown for convenience of description, and the present disclosure is not necessarily limited to what is illustrated in the drawings, and the size or shape of the components illustrated in the drawings may be exaggerated for clarity and convenience of explanation. Therefore, the terms especially defined in consideration of the configuration and operation of the present disclosure may vary according to intentions or customs of users and operators, and definitions of these terms should be made based on the content throughout this specification.

In the present specification, unless specifically disclosed otherwise, terms such as 'upper side', 'upper part', 'upper end' and the like refer to a side where ingredients are input or a part or end close thereto, and terms such as 'lower side', 'lower part', 'lower end' and the like refer to an opposite side of the side where ingredients are input or a part or end close thereto.

Hereinbelow, referring to the drawings for explaining a driving apparatus for combined use of juicer and mixer according to embodiments of the present disclosure, the present disclosure will be explained.

Figure 2:
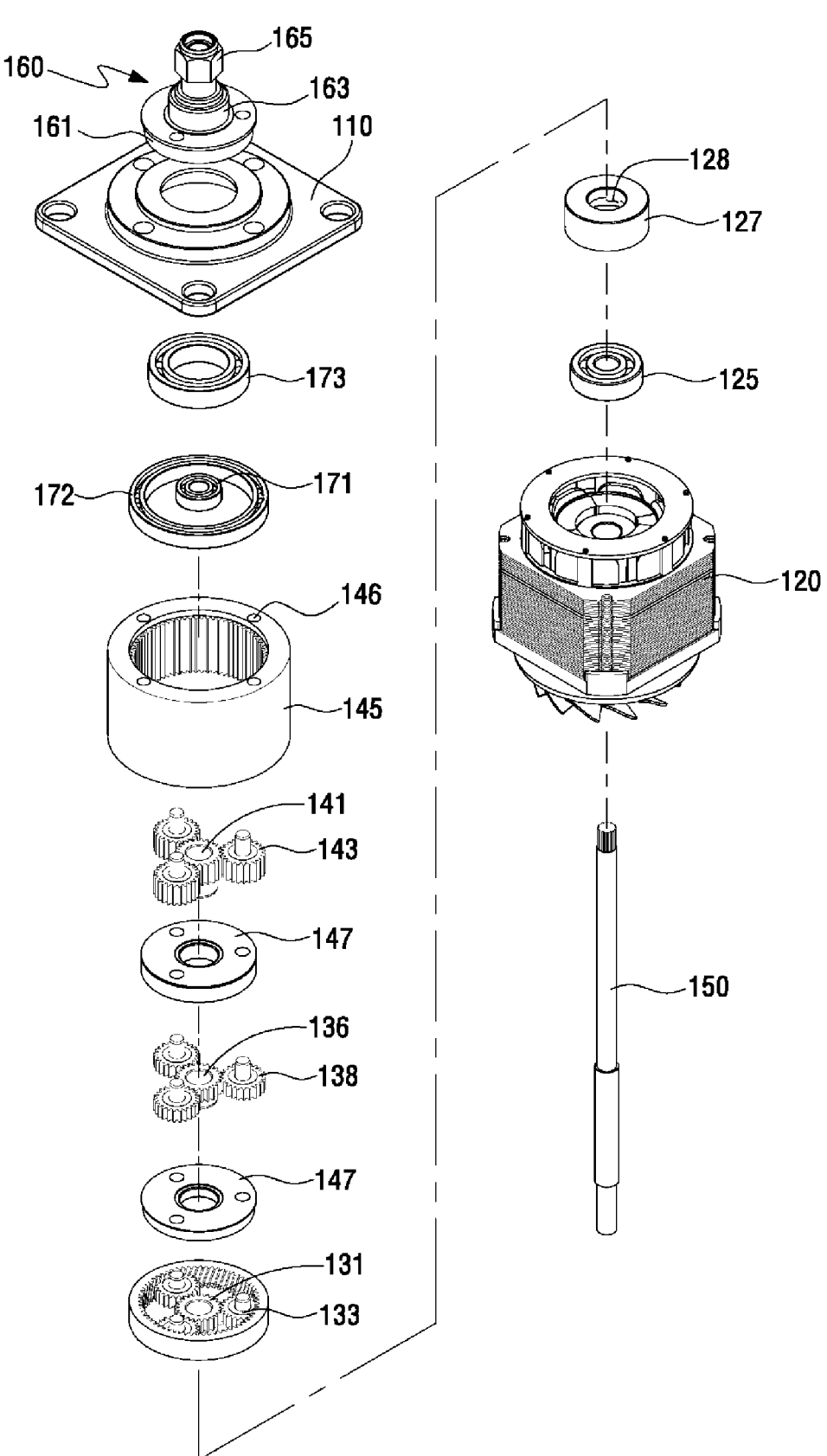
FIG. 2 is an exploded perspective view of FIG. 1.
Figure 3:
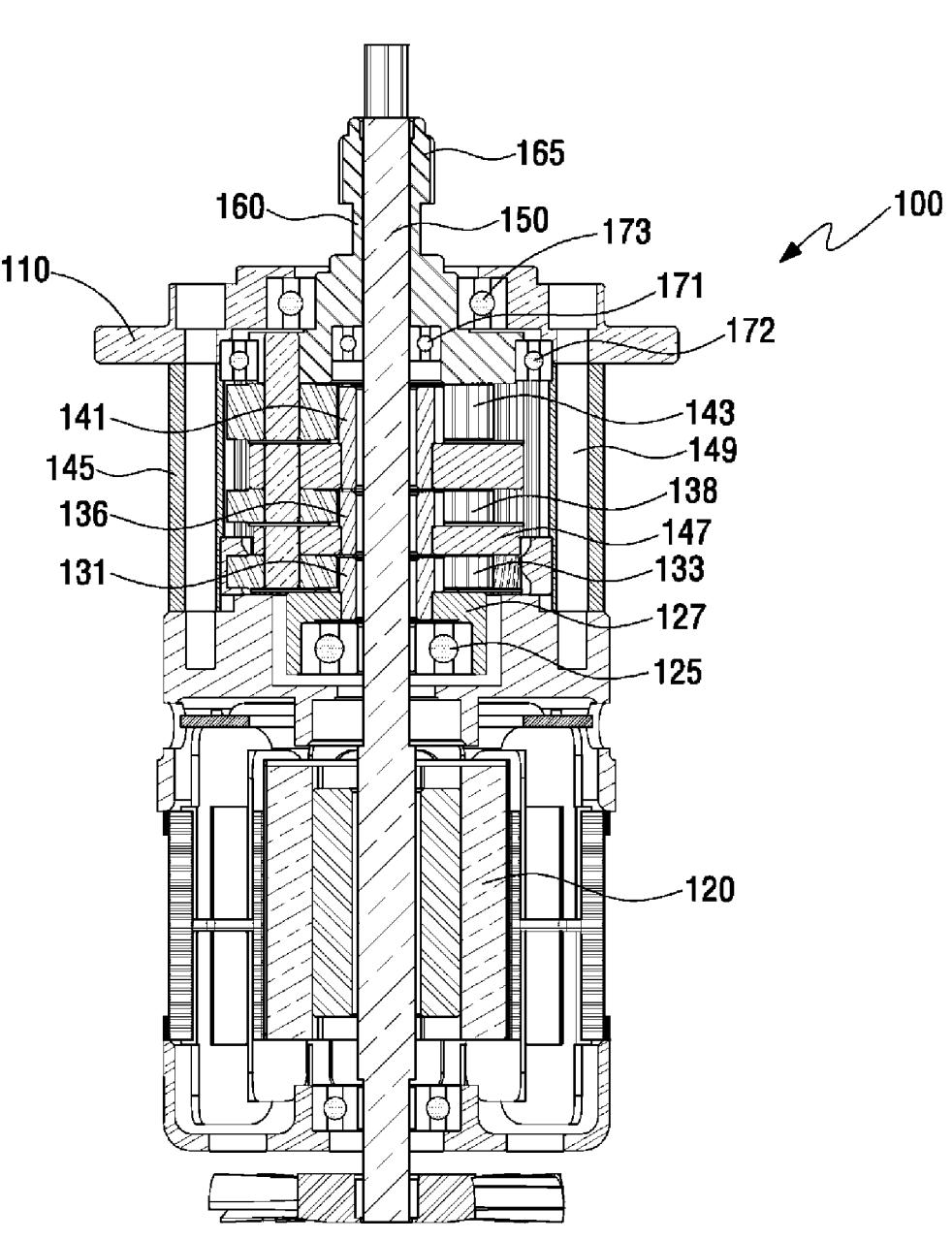
FIG. 3 is a cross-sectional view of FIG. 1.
Figure 4:
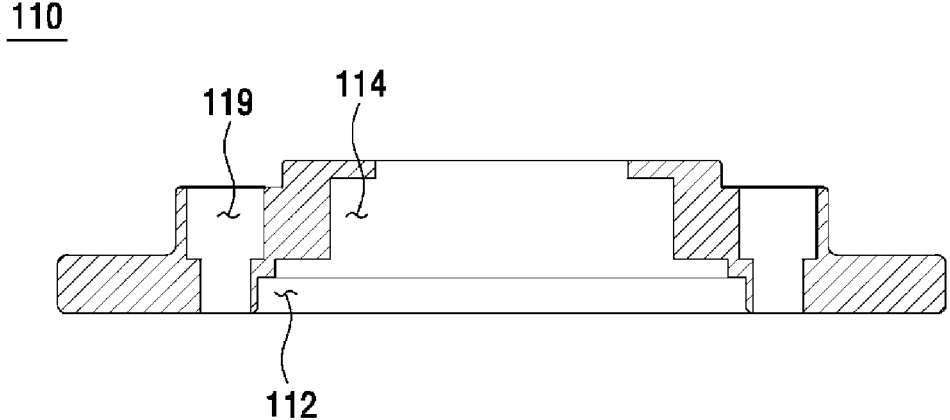
FIG. 4 is a cross-sectional view of a second driving shaft.
Figure 5:
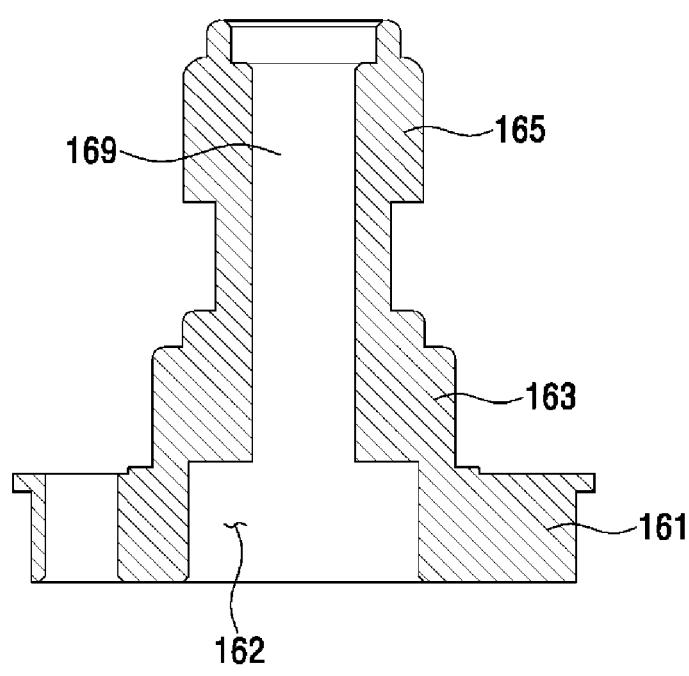
FIG. 5 is a cross-sectional view of a support part.

FIG. 1 is a perspective view of a driving apparatus for combined use of juicer and mixer according to an embodiment of the present disclosure, FIG. 2 is an exploded perspective view of FIG. 1, FIG. 3 is a cross-sectional view of FIG. 1, FIG. 4 is a cross-sectional view of a second driving shaft, and FIG. 5 is a cross-sectional view of a support part.

As illustrated in FIGS. 1 to 3, a driving apparatus for combined use of juicer and mixer 100 according to an embodiment of the present disclosure may be configured to include a driving part, a first driving shaft 150, a second driving shaft 160, a support part 110, a first bearing 171 and a second bearing 172. In addition, a third bearing 173 may be further included.

The driving part is a combination of components that generate and transmit the power for rotating the first driving shaft 150 and the second driving shaft 160. The driving part may be configured to include a motor 120, a clutch bearing 125 and a deceleration part.

The motor 120 rotates the first driving shaft 150 a high speed. Here, the first driving shaft 150 may be a motor shaft of the motor 120 or have an additional shaft form coupled to extend in a longitudinal direction of the motor shaft of the motor 120. An end part of the first driving shaft 150 is formed to protrude outside of an upper surface of the support part 110.

To the end part of the first driving shaft 150, a mixer blade (not illustrated) may be coupled. Here, as illustrated, it is possible to form the end part of the first driving shaft 150 as a prismatic shaft or form the surface of the first driving shaft 150 to have a shape where a protruding part and a groove part are repeated, and form a hollow shaft having a corresponding shape on the shaft of the mixer blade, to strengthen the coupling force between the mixer blade and the first driving shaft 150. Conversely, it is possible to form the end part of the first driving shaft 150 as a hollow shaft, and couple the mixer blade to the first driving shaft 150 by inserting the shaft of the mixer blade into the hollow part of the first driving shaft 150. Therefore, by coupling the mixer blade to the end part of the first driving shaft 150 that rotates at a high speed, it is possible to rotate the mixer blade 292 at a high speed.

Here, for the motor 120, it is desirable to use a brushless motor (BLDC motor) that enables controlling of the rotation direction in one direction and the other direction, and where a brush that can be easily worn is removed from inside the motor 120 to increase the durability, and that has no difficulty in high-speed rotation, but there is no limitation thereto.

The clutch bearing 125 may be mounted on the first driving shaft 150 that extends to an upper portion of the motor 120. The clutch bearing 125 is a bearing that transmits power in only one direction, and when the first driving shaft 150 inserted in the middle rotates in one direction (for example, in counterclock direction), the lock is released to allow free rotation of the first driving shaft 150, and when the first driving shaft 150 rotates in the other direction (for example, in clock direction), it is locked, transmitting the driving force of the first driving shaft to a power transmission part 127 coupled to an outer ring of the clutch bearing 125. As illustrated, the power transmission part 127 may be formed to be fitted to an outer side surface of the clutch bearing 125, and on an upper surface of the power transmission part 127, a hollow part 128 into which a first sun gear 131 may be inserted may be formed on the upper surface of the power transmission part 127.

At an upper end of the first driving shaft 150, a second driving shaft 160 may be formed, where a penetration hole 169 is formed such that the first driving shaft 150 can penetration through therein. That is, the second driving shaft 160 and the first driving shaft 150 are formed in a concentric dual shaft shape such that the second driving shaft 160 surrounds an outer side of an end of the first driving shaft 150. At an upper end of the second driving shaft 160, a prismatic protrusion 165 is formed, that protrudes in a prismatic form so as to be inserted into and coupled to a prismatic shaft hole formed in a rotation shaft of a screw (not illustrated), and a lower end of the second driving shaft 160 is positioned inside the support part 110. That is, the end part of the second driving shaft 160 is also formed to protrude on an upper surface of the support part 110.

The support part 110 has a hole at a center thereof, and as mentioned above, the upper end of the first driving shaft 150 and the second driving shaft 160 having the dual shaft shape protrudes through the hole, and the support part 110 rotatably supports the second driving shaft 160. A plurality of screw holes 119 are formed around the center of the support part 110, and also in a ring gear 145 in a position corresponding to the screw hole 119, there may be formed a screw hole 146 penetrating up and down, so that a screw may be inserted into the screw hole 119, 146, thereby fixing the ring gear 145 and the support part 110.

Here, between an outer surface of the first driving shaft 150 and an inner surface of the second driving shaft 160, a first bearing 171 may be disposed, and between an outer surface of the second driving shaft 160 and an inner surface of the support part 110, a second bearing 172 may be disposed. Therefore, the second driving shaft 160 may be rotatable relatively to the support part 110 and the first driving shaft 150.

Here, in this embodiment, the first bearing 171 and the second bearing 172 are not arranged at different up and down heights, but are arranged at a same position or overlapping position in a horizontal direction. That is, the first bearing 171 may be disposed at the inner side of the second bearing 172 to reduce the length of the entire shaft, thereby making the entire driving apparatus more compact.

In addition, on an upper position of the second bearing 172, a third bearing 173 may be disposed between the second driving shaft 160 and the support part 110. Therefore, in the present disclosure, two-tier bearings 172, 173 may be disposed between the second driving shaft 160 and the support part 110, and one-tier bearing 171 may be disposed between the first driving shaft 150 and the second driving shaft 160, making it a total of three bearings 171, 172, 173 between the first driving shaft 150, the second driving shaft 160 and the support part 110.

At the center of a bottom surface of the second driving shaft 160, a first bearing insertion groove 162 cut in a larger circular diameter than the penetration hole 169 is formed around the penetration hole 169 into which the first drive shaft 150 may be inserted. Therefore, through the first bearing insertion groove 162, the first bearing 171 may be disposed between the first driving shaft 150 and the second driving shaft 160.

In addition, the second driving shaft 160 includes a lower flange part 161 having a large diameter in a flange form on its lower end and a second bearing 172 disposed on an outer surface, an intermediate shaft part 163 having a smaller diameter than the lower flange part 161 above the lower flange part 161 and a third bearing 173 disposed on its outer surface, and the prismatic protrusion 165 positioned above the intermediate shaft part 163.

Here, at the center of a bottom surface of the support part 110, a second bearing insertion groove 112 cut in a circular shape is formed, and thus in a separation space between an inner surface of the second bearing insertion groove 112 and an outer surface of the second driving shaft 160, the second bearing 172 may be disposed. Here, as described above, the first bearing 171 is positioned at an inner side of the second bearing 172.

In addition, on the outer surface of the intermediate shaft part 163, the third bearing 173 is disposed. Here, above the second bearing insertion groove 112, a third bearing insertion groove 114 cut in a circular shape with a smaller diameter than the second bearing insertion groove 112 is formed so that the third bearing 173 can be disposed. Therefore, in a separation space between an inner surface of the third bearing insertion groove 114 and the outer surface of the intermediate shaft part 163, the third bearing 173 may be disposed, and here, the third bearing 173 may be disposed on an upper surface of the lower flange part 161.

Between the second driving shaft 160 described above and the clutch bearing 125, there may be formed a deceleration part for rotating the second driving shaft 160 at a low speed by decelerating the rotation speed of the motor 120.

The deceleration part may be configured to include a sun gear 131, 136, 141, planetary gear 133, 138, 143, and ring gear 145.

As illustrated in FIG. 3, the first sun gear 131 is disposed to be inserted into the first driving shaft 150, and a lower end of the first sun gear 131 may be inserted into the hollow part 128 formed in the power transmission part 127 so as to rotate on the first driving shaft 150 together with the power transmission part 127. Here, on an outer surface of an upper end of the first sun gear 131, gears are formed along a circumferential direction, and a plurality of first planetary gears 133 (three planetary gears are formed in the drawings) are gear-coupled to the gears of the first sun gear 131 along the circumference of the first sun gear 131.

In addition, the ring gear 145 for gear-coupling with the plurality of first planetary gears 133 is disposed so as to surround an outside of the plurality of first planetary gears 133. Here, as described above, the ring gear 145 is fixed by a screw 149 together with the support part 102 so that its position is fixed.

Therefore, the plurality of first planetary gears 133 are each gear-coupled with the ring gear 145 and the first sun gear 131, and are interposed between the ring gear 145 and the first sun gear 131, and when the first sun gear 131 rotates, the plurality of first planetary gears 133 rotate themselves and also orbit around the first sun gear 131.

Here, as illustrated, the configuration of the sun gear 131, 136, 141 and the plurality of planetary gears 133, 138, 143 may be formed in multi-tiers, where the second sun gear 136 and the plurality of second planetary gears 138 are formed above the first sun gear 131 and the plurality of first planetary gears 133, and the third sun gear 141 and the plurality of third planetary gears 143 are formed above the second sun gear 136 and the plurality of second planetary gears 138. Here, between each tier, there may be formed a carrier 147 that supports the shaft of the planetary gear 133, 138 positioned below, that rotates together with the orbital motion of the planetary gear 133, 138, and that couples the sun gear 136, 141 positioned above to the center and transmits rotational force.

Here, the shaft of the third planetary gear 143 positioned at the most top end may be inserted into the lower flange part 161 of the second driving shaft 160 described above to be supported. Therefore, as the plurality of planetary gears 133, 138, 143 perform the orbital motion together with rotational motion, the second driving shaft 160 on the upper part is decelerated in multi-tiers at a low speed, to perform a rotational motion.

In the present embodiment, explanation is made based on an example where the sun gear 131, 136, 141 and the plurality of planetary gears 133, 138, 143 are configured in three-tiers and the rotational speed of the motor 120 is decelerated in multi-tiers, but there is no limitation thereto, that is, the sun gear 131, 136, 141 and the plurality of planetary gears 133, 138, 143 may be configured in one-tier or in two-tiers. Moreover, they may be configured in three-tiers or more.

Hereinbelow, operations of the driving part for rotating the first driving shaft 150 and the second driving shaft 160 at a high and low speed according to an embodiment of the present disclosure will be described.

Figure 6:
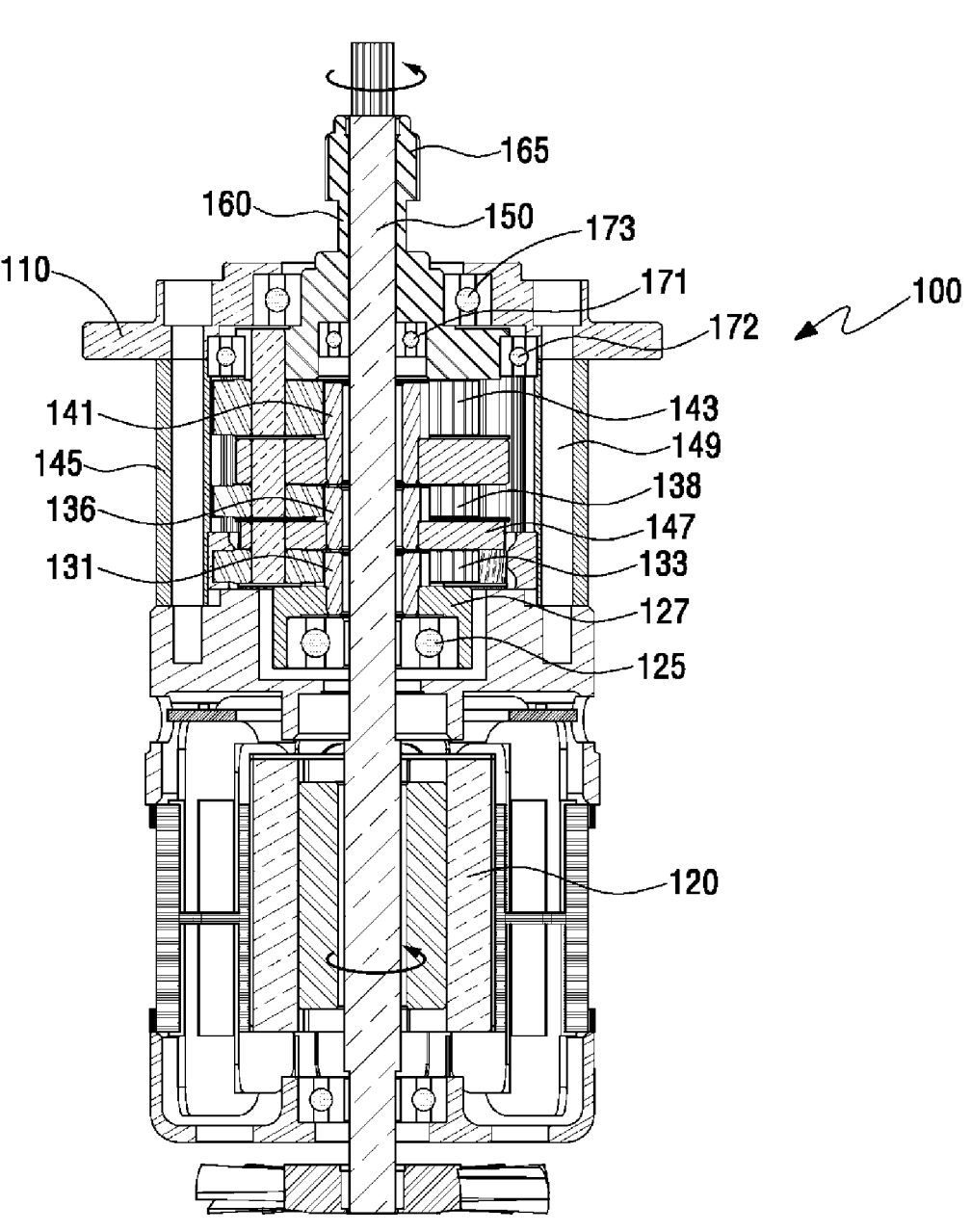
FIG. 6 illustrates operations of FIG. 3 when used as a mixer.
Figure 7:
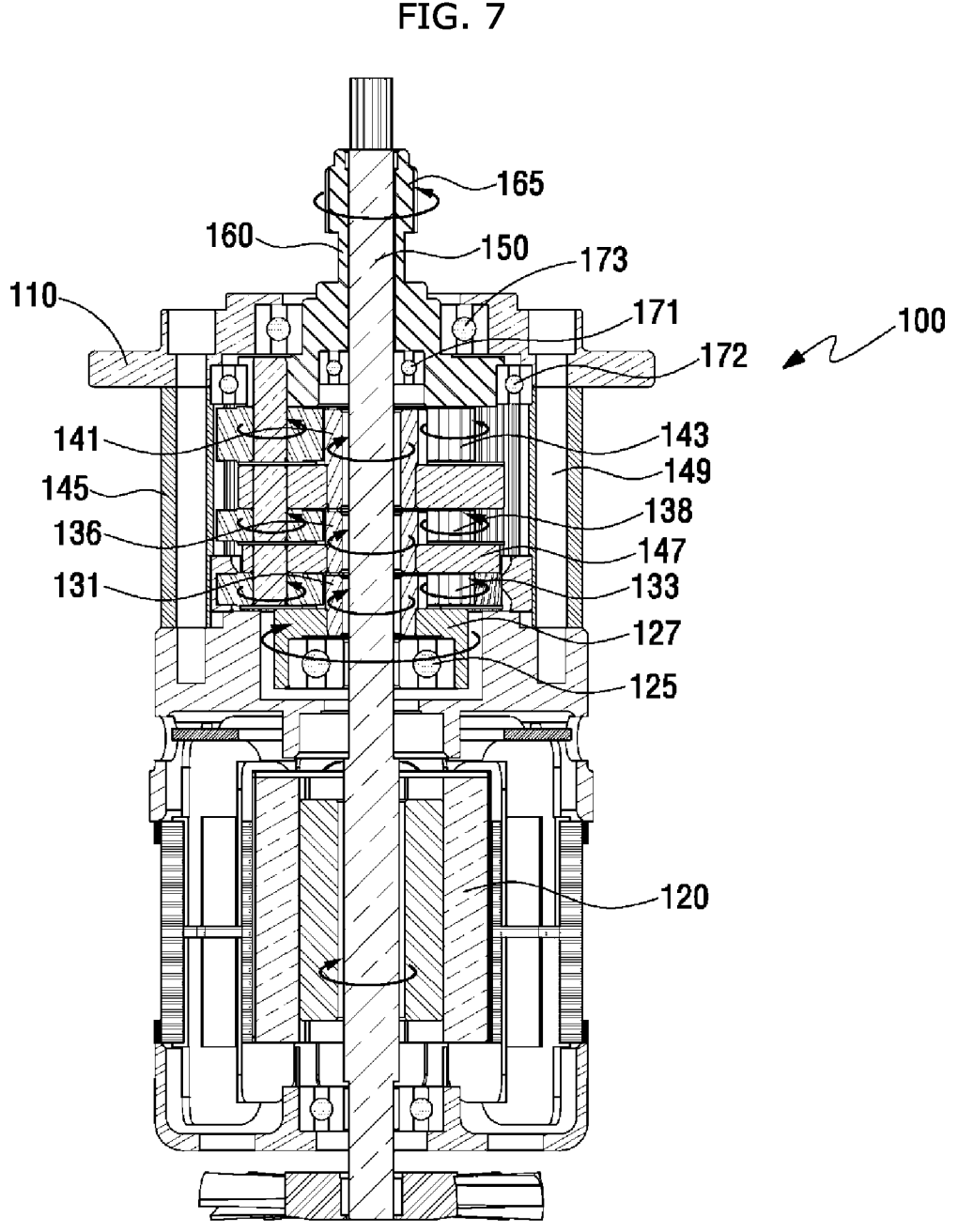
FIG. 7 illustrates operations of FIG. 3 when used as a juicer.

FIG. 6 illustrates operations of FIG. 3 when used as a mixer, and FIG. 7 illustrates operations of FIG. 3 when used as a juicer.

As illustrated in FIG. 6, when the motor 120 is rotated in counterclock direction at a high speed, the locking of the clutch bearing 125 mounted on the first driving shaft 150 is released, so that the first driving shaft 150 can rotate at a high speed together with the rotation of the motor 120. Therefore, when a mixer blade of a mixer is coupled to the end part of the first driving shaft 150, it may be used as a mixer where the mixer blade rotates at a high speed.

Here, when the first driving shaft 150 is rotating at a high speed, power transmission can be blocked by the clutch bearing 125, and thus the second driving shaft 160 including the deceleration part will not operate. Therefore, it is possible to block unnecessary operations of the deceleration part of operating the second driving shaft 160 at a low speed, thereby reducing problems such as power loss, noise, wear and failure.

Next, as illustrated in FIG. 7, when the motor is rotated in clock direction at a high speed, the clutch bearing 125 is locked, and thus power is transmitted to the power transmission part 127 that is coupled to an outer ring of the clutch bearing 125, and due to the gear coupling of the sun gear 131, the plurality of planetary gears 133, and the ring gear 145 coupled to the power transmission part 127, the plurality of planetary gears 133 will perform an orbital motion at a low speed together with rotation. Here, as described above, the sun gear 131, 136, 141 and the plurality of planetary gears 133, 138, 143 may be formed in multi-tiers. Here, the second driving shaft 160 coupled to the upper shaft of the plurality of planetary gears 143 is decelerated as the plurality of planetary gears 131, 136, 143 perform an orbital motion, and is supported between the support part 102 and the first driving shaft 150 by the first bearing 171, the second bearing 172 and the third bearing 173, to rotate at a low speed. Therefore, when a lower rotation shaft of the screw 300 is coupled to the end part of the second driving shaft 160, it may be used as a juicer where the screw 300 rotates at a low speed.

The scope of right of the present disclosure is not limited to the embodiments described above, but may be implemented in various forms of embodiments within the scope of the appended utility model claims. Without departing from the gist of the present disclosure claimed in the appended utility model claims, to various extents that can be modified by any one with ordinary skill in the art to which the present disclosure pertains are deemed to be within the scope of the claims of the present disclosure.

What is claimed is:

1. A driving apparatus for combined use of juicer and mixer, the apparatus comprising:
   a driving part for generating power, the driving part comprises:
      a motor for rotating a first driving shaft at a predetermined speed,
      a clutch bearing disposed on the first driving shaft and transmits torque only when the first driving shaft rotates in one direction, and
      a deceleration part formed between a second driving shaft and the clutch bearing and decelerates the rotation of the motor to rotate the second driving shaft at a lower speed than the predetermined speed;
   the first driving shaft that is rotated by the driving part, and the second driving shaft having a hollow shaft through which the first driving shaft penetrates and rotating at a different speed from the first driving shaft;
   a support part that has a hole through which an end part of the first driving shaft and the second driving shaft protrude, and that rotatably supports the second driving shaft;
   a first bearing disposed between the first driving shaft and the second driving shaft; and
   a second bearing disposed between the second driving shaft and the support part,
   wherein the first bearing and the second bearing are disposed to overlap each other in a horizontal direction.

2. The driving apparatus for combined use of juicer and mixer, according to claim 1,
   wherein at a center of a bottom surface of the second driving shaft, there is formed a first bearing insertion groove into which the first bearing is inserted.

3. The driving apparatus for combined use of juicer and mixer, according to claim 1,
   wherein at a center of a bottom surface of the support part, there is formed a second bearing insertion groove into which the second bearing is inserted.

4. The driving apparatus for combined use of juicer and mixer, according to claim 3, further comprising a third bearing that is disposed between the second driving shaft and the support part at an upper position than the second bearing.

5. The driving apparatus for combined use of juicer and mixer, according to claim 4, wherein the second driving shaft comprises a lower flange part having an outer surface where the second bearing is disposed; and an intermediate shaft part having a smaller diameter than the lower flange part above the lower flange part, and an outer surface where the third bearing is disposed.

6. The driving apparatus for combined use of juicer and mixer, according to claim 5, wherein the third bearing is disposed on an upper surface of the lower flange part.

7. The driving apparatus for combined use of juicer and mixer, according to claim 1, wherein the driving part further comprises a power transmission part that is coupled to surround an outer ring of the clutch bearing and rotates when the first driving shaft rotates in one direction.

8. The driving apparatus for combined use of juicer and mixer, according to claim 7, wherein the deceleration part comprises a sun gear that is disposed on the first driving shaft and that has an end part coupled to a hollow part formed in the power transmission part, to rotate;

a plurality of planetary gears that are gear-coupled to the sun gear, to rotate; and a ring gear that is formed to surround an outer side of the plurality of planetary gears and that is gear-coupled to the plurality of planetary gears.

9. The driving apparatus for combined use of juicer and mixer, according to claim 8, wherein the sun gear and the plurality of planetary gears are formed in multi-tiers, and between each tier, a carrier is formed that supports the plurality of planetary gears and rotates.

10. A driving apparatus for combined use of juicer and mixer, the apparatus comprising:

a driving part for generating power;

a first driving shaft that is rotated by the driving part, and a second driving shaft having a hollow shaft through which the first driving shaft penetrates and rotating at a different speed from the first driving shaft;

a support part that has a hole through which an end part of the first driving shaft and the second driving shaft protrude, and that rotatably supports the second driving shaft;

a first bearing disposed between the first driving shaft and the second driving shaft; and a second bearing disposed between the second driving shaft and the support part, a third bearing that is disposed between the second driving shaft and the support part at an upper position than the second bearing, wherein the first bearing and the second bearing are disposed to overlap each other in a horizontal direction, wherein at a center of a bottom surface of the support part, there is formed a second bearing insertion groove into which the second bearing is inserted, wherein the support part has a third bearing insertion groove with a smaller diameter above the second bearing insertion groove so that the third bearing can be inserted.

\* \* \* \* \*